United States Patent Office 3,828,091
Patented Aug. 6, 1974

3,828,091
2-ARYL-3-ALIPHATICTHIOACRYLONITRILES
Jerry G. Strong, Westfield, N.J., assignor to
Mobil Oil Corporation
No Drawing. Filed Sept. 25, 1970, Ser. No. 75,756
Int. Cl. C07c 121/70
U.S. Cl. 260—465 F 11 Claims

ABSTRACT OF THE DISCLOSURE

2-Aryl-3-aliphaticthioacrylonitriles form a new class of herbicides. They are effective as both pre-emergence and post-emergence herbicides. They are highly effective against Crabgrass, Yellow Foxtail grass, Johnson grass, Barnyard grass and Turnip (representative of weedy mustards). These compounds are readily synthesized by reacting an appropriate mercaptan with an appropriate acrylonitrile in the presence of an organic solvent which azeotropes with water and a suitable acid catalyst.

CROSS-REFERENCE TO RELATED APPLICATIONS

The compounds of this invention are used as reactants in a new process for producing 2-aryl-3-aliphaticsulfonylacrylonitriles described and claimed in application Ser. No. 75,754 filed of even date herewith and with the title 2-Aryl-3-Aliphaticsulfonylacrylonitriles, Synthesis and Use as Fungicides.

BACKGROUND OF THE INVENTION

Field of the Invention

This invention is directed to novel 2-aryl-3-aliphaticthioacrylonitriles, their synthesis and use as herbicides.

Description of the Prior Art

In U.S. Pat. No. 3,478,105, there are disclosed 3-alkylaminoatroponamides as pesticides. In United States Pat. No. 3,485,925, there are disclosed 3-haloatroponitriles as fungicides and bactericides and as precursors to the 3-alkylaminoatroponamides of 3,478,105.

Only one 2-aryl-3-aliphaticthioacrylonitrile has been described to our knowledge in the literature (S. Scheithauer and R. Mayer, Chem. Ber., 100, 1413–1427 [1967]). This compound is 3-methyl-3-methylthioatroponitrile and is prepared from phenylacetonitrile, methyl dithioacetate and methyl iodide. A method is disclosed (M. Cariou, Bull. Soc. Chim. France, 1, 198 [1969]) for the production of 3-alkyloxyatroponitriles using alkyl alcohols.

SUMMARY OF THE INVENTION

This invention provides compounds having the formula

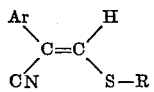

wherein Ar is a member selected from the group consisting of (1) an aromatic radical, a heteroaromatic radical, and a combination of an aromatic and heteroaromatic radical, and (2) a member of group (1) containing at least one substituent selected from the group consisting of halogen, thiocyanato, $NO_2$, alkoxy (e.g., $C_1$–$C_4$), haloalkyl (e.g., $C_1$–$C_4$), aryl, substituted aryl, aroyl, cyano, alkylmercapto (e.g., $C_1$–$C_4$), alkyl sulfonyl, aryl sulfonyl, haloalkyl sulfonyl, carbalkoxy (e.g., $C_2$–$C_5$), dialkylamino (e.g., $C_1$–$C_4$), amide, alkyl (e.g., $C_1$–$C_6$), and cycloalkyl (e.g., $C_3$–$C_6$), and R is a member selected from the group consisting of alkyl (e.g., $C_1$–$C_8$) alkenyl (e.g., $C_2$–$C_8$), alkynyl (e.g., $C_2$–$C_8$), and cycloalkyl (e.g., $C_3$–$C_8$); their synthesis; their use as herbicides; and herbicidal compositions comprising at least one such compound and a carrier therefor.

DESCRIPTION OF SPECIFIC EMBODIMENTS

As will be noted from the above formula, the compounds of this invention are 3-aliphaticthioacrylonitriles substituted in the 2-position with a group hereinbefore defined as Ar. Non-limiting examples of the compounds of this invention include:

3-(sec-butylthio)-2-(3-pyridyl)acrylonitrile,
3-(sec-butylthio)-2-(p-fluorophenyl)acrylonitrile,
3-(n-butylthio)-2-(2-furanyl)acrylonitrile,
3-(sec-butylthio)-2-(m-chlorophenyl)acrylonitrile,
3-ethylthio-2-(2-benzfuranyl)acrylonitrile,
3-(sec-butylthio)-2(p-nitrophenyl)acrylonitrile,
3-methylthio-2-(2-thenoyl)acrylonitrile,
3-(sec-butylthio)-2-(p-cyanophenyl)acrylonitrile,
3-(iso-butylthio)-2-(p-isopropylphenyl)acrylonitrile,
3-(sec-butylthio)-2-(p-dimethylaminophenyl)acrylonitrile,
3-ethylthio-2-(m-nitro-p-chlorophenyl)acrylonitrile,
3-(sec-butylthio)-2-(p-ethoxyphenyl)acrylonitrile,
3-(sec-butylthio)-2-(p-ethylmercaptophenyl)acrylonitrile,
3-(n-butylthio)-2-(p-ethylsulfonylphenyl)acrylonitrile,
3-(sec-butylthio)-2-phenylacrylonitrile,
3-methylthio-2-(2,4-dichlorophenyl)acrylonitrile,
3-isopropylthio-2-(p-fluorophenyl)acrylonitrile,
3-isopropylthio-2-(p-chlorophenyl)acrylonitrile,
3-(tert-butylthio)-2-(p-fluorophenyl)acrylonitrile,
3-(tert-butylthio)-2-phenylacrylonitrile,
3-(n-butylthio)-2-(p-chlorophenyl)acrylonitrile,
3-(n-butylthio)-2-phenylacrylonitrile,
3-methylthio-2-(pfluorophenyl)acrylonitrile,
3-(n-pentylthio)-2-(p-nitrophenyl)acrylonitrile,
3-cyclopentylthio-2-(p-chlorophenyl)acrylonitrile,
3-ethenylthio-2-(p-fluorophenyl)acrylonitrile,
3-methylthio-2-(p-methylphenyl)acrylonitrile, and
3-allylthio-2-(p-bromophenyl)acrylonitrile.

In the synthesis of the compounds of this invention, an organic solvent is used which azeotropes with water, a by-product of the reaction. Non-limiting examples of such a solvent are benzene and toluene.

Also, in this synthesis it is advantageous to use an acid catalyst. Non-limiting examples of such acid catalysts are organic and inorganic acids such as p-toluenesulfonic acid, sulfuric acid, hydrochloric acid, benzoic acid and phosphoric acid.

The amount of acid catalyst used in the synthesis of this invention may be from about 0.1 to about 50 g. The amount present in the reaction affects primarily the reaction rate such that the greater the quantity of acid catalyst, the faster the reaction proceeds to completion. In the examples hereinafter presented of the synthesis of this invention, about 0.5 to about 30 g. acid catalyst was used.

The compounds of this invention are readily prepared by the following general procedure:

An appropriate acrylonitrile substituted in the 3-position with a hydroxy group and comprising a group hereinbefore defined as Ar in the 2-position is reacted with an appropriate mercaptan comprising a group hereinbefore defined as R. The reactants are added to a suitable organic solvent which azeotropes with water and which contains a suitable acid catalyst. The resulting solution is stirred and heated to reflux until the volume of azeotroped water collected in a suitable trap remains constant. The solution is then cooled, washed with sodium hydroxide solution, dried, and concentrated. It is then distilled to give the product 2-aryl-3-aliphaticthioacrylonitriles.

The reaction may be diagrammed as follows:

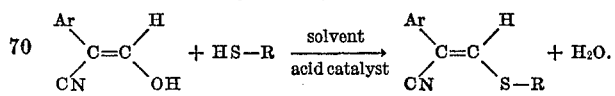

The following examples demonstrate the typical procedure. Structural verification by IR is shown in Table I following the examples.

EXAMPLE 1

3-(sec-butylthio)-2-(p-fluorophenyl)acrylonitrile

A solution of 184.0 g. of 3-hydroxy-2-(p-fluorophenyl)acrylonitrile and 102.0 g. of sec-butyl mercaptan in 1.8 liters of benzene containing 30.0 g. of p-toluenesulfonic acid was stirred and heated to reflux. Heating was continued until the volume of azeotroped water collected in a Dean-Stark trap remained constant. The solution then was cooled, washed with 5% sodium hydroxide solution, dried over magnesium sulfate, and concentrated to provide a viscous liquid. This liquid was distilled through a short path apparatus to yield 214.0 g. of 3-(sec-butylthio)-2 - (p-fluorophenyl)acrylonitrile with a boiling point of 142–148° C. at 0.3 mm. IR supports the proposed structure (Table I).

Elemental Analysis (for $C_{13}H_{14}FNS$):
Calc.: C 66.35%, H 6.00%
Found: C 66.41%, H 6.16%

EXAMPLE 2

3-isopropylthio-2-(p-fluorophenyl)acrylonitrile

Same procedure as in Example 1 using 16.3 g. of 3-hydroxy-2-(p-fluorophenyl)acrylonitrile, 8.0 g. of isopropyl mercaptan, 200 ml. of benzene and about 0.5 g. of p-toluenesulfonic acid. A 22.6 g. sample of 3-isopropylthio-2-(p-fluorophenyl)acrylonitrile was obtained with a boiling point of 131–134° C. at 0.25 mm. IR supports the proposed structure (Table I).
Elemental Analysis (for $C_{12}H_{12}FNS$):
Calc.: C 65.12%, H 5.47%
Found: C 65.12%, H 5.53%

EXAMPLE 3

3-(tert-butylthio)-2-(p-fluorophenyl)acrylonitrile

Same procedure as in Example 1 using 16.3 g. of 3-hydroxy-2-(p-fluorophenyl)acrylonitrile, 9.1 g. of tert-butyl mercaptan, 200 ml. of benzene and about 0.5 g. of p-toluenesulfonic acid. A 16.0 g. sample of 3-(tert-butylthio) - 2-(p-fluorophenyl)acrylonitrile was obtained. IR supports the proposed structure (Table I).

EXAMPLE 4

3-isopropylthio-2-(p-chlorophenyl)acrylontrile

Same procedure as in Example 1 using 18.0 g. of 3-hydroxy-2-(p-chlorophenyl)acrylonitrile, 8.0 g. of isopropyl mercaptan, 200 ml. of benzene and about 0.5 g. of p-toluenesulfonic acid. A 12.1 g. sample of crystalline 3-isopropylthio - 2 - (p-chlorophenyl)acrylonitrile was obtained with a melting point of 61–63° C. IR supports the proposed structure (Table I).

EXAMPLE 5

3-(sec-butylthio)-2-(m-chlorophenyl)acrylontrile

Same procedure as in Example 1 using 7.2 g. of 3-hydroxy-2-(m-chlorophenyl)acrylonitrile, 3.7 g. of sec-butyl mercaptan, 150 ml. of benzene and about 0.5 g. of p-toluenesulfonic acid. A 7.7 g. sample of 3-(sec-butylthio)-2-(m-chlorophenyl)acrylonitrile was obtained. IR supports the proposed structure (Table I).

EXAMPLE 6

3-(n-butylthio)-2-phenylacrylonitrile

Same procedure as in Example 1 using 14.5 g. of 3-hydroxy-2-phenylacrylonitrile, 9.1 g. of n-butyl mercaptan, 200 ml. of benzene and about 0.5 g. of p-toluenesulfonic acid. A 13.6 g. sample of 3-(n-butylthio)-2-phenylacrylonitrile was obtained. IR supports the proposed structure (Table I).

EXAMPLE 7

3-(n-butylthio)-2-(p-chlorophenyl)acrylonitrile

Same procedure as in Example 1 using 18.0 g. of 3-hydroxy-2-(p-chlorophenyl)acrylonitrile, 10.8 g. of n-butyl mercaptan, 150 ml. of benzene and about 0.5 g. of p-toluenesulfonic acid. A 20.8 g. sample of 3-(n-butylthio)-2-(p-chlorophenyl)acrylonitrile was obtained. IR supports the proposed structure (Table I).

EXAMPLE 8

3-(sec-butylthio)-2-(p-methoxyphenyl)acrylonitrile

Same procedure as in Example 1 using 7.0 g. of 3-hydroxy-2-(p-methoxyphenyl)acrylonitrile, 3.7 g. of sec-butyl mercaptan, 150 ml. of benzene and about 0.5 g. of p-toluenesulfonic acid. A 9.3 g. sample of 3-(sec-butylthio)-2-(p-methoxyphenyl)acrylonitrile was obtained. IR supports the proposed structure (Table I).

EXAMPLE 9

3-isopropylthio-2-(o-methylphenyl)acrylonitrile

Same procedure as in Example 1 using 6.4 g. of 3-hydroxy-2-(o-methylphenyl)acrylonitrile, 3.1 g. of isopropyl mercaptan, 150 ml. of benzene and about 0.5 g. of p-toluenesulfonic acid. A 7.4 g. sample of 3-isopropylthio-2-(o-methylphenyl)acrylonitrile was obtained. IR supports the proposed structure (Table I).

EXAMPLE 10

3-(2-methyl-2-propenylthio)-2-(p-chlorophenyl)acrylonitrile

Same procedure as in Example 1 using 7.2 g. of 3-hydroxy-2-(p-chlorophenyl)acrylonitrile, 3.7 g. of 2-methyl-2-propenyl mercaptan, 150 ml. of benzene and about 0.5 g. of p-toluenesulfonic acid. A 6.4 g. sample of 3-(2-methyl - 2-propenylthio)-2-(p-chlorophenyl)acrylonitrile was obtained. IR supports the proposed structure (Table I).

EXAMPLE 11

3-(sec-butylthio)-2-(m-methylphenyl)acrylonitrile

Same procedure as in Example 1 using 6.4 g. of 3-hydroxy-2-(m-methylphenyl)acrylonitrile, 3.7 g. of sec-butyl mercaptan, 150 ml. of benzene and about 0.5 g. of p-toluenesulfonic acid. A 5.7 g. sample of 3-(sec-butylthio)-2-(m-methylphenyl)acrylonitrile was obtained. IR supports the proposed structure (Table I).

EXAMPLE 12

3-(sec-butylthio)-2-(o-chlorophenyl)acrylonitrile

Same procedure as in Example 1 using 7.2 g. of 3-hydroxy-2-(o-chlorophenyl)acrylonitrile, 3.7 g. of sec-butyl mercaptan, 150 ml. of benzene and about 0.5 g. of p-toluenesulfonic acid. A 10.1 g. sample of 3-(sec-butylthio)-2-(o-chlorophenyl)acrylonitrile was obtained. IR supports the proposed structure (Table I).

EXAMPLE 13

3-(n-butylthio)-2-(2,4-dichlorophenyl)acrylonitrile

Same procedure as in Example 1 using 15.0 g. of 3-hydroxy-2-(2,4-dichlorophenyl)acrylonitrile, 6.4 g. of n-butyl mercaptan, 200 ml. of benzene and about 1.0 g. of p-toluenesulfonic acid. An 18.1 g. sample of 3-(n-butylthio)-2-(2,4-dichlorophenyl)acrylonitrile was obtained. IR supports the proposed structure (Table I).

TABLE I

Structural verification of compounds of the examples

| Example: | IR values |
|---|---|
| 1 | λ (film): 4.5 (m), 6.2 (m), 8.1 (s), 11.9 (s) μ. |
| 2 | Do. |
| 3 | Do. |
| 4 | λ (KBr): 4.5 (m), 6.2 (m), 8.1 (s), 11.9 (s) μ. |
| 5 | λ (film): 8.1 (s), 11.9 (s) μ. |
| 6 | Do. |
| 7 | Do. |
| 8 | Do. |
| 9 | Do. |
| 10 | Do. |
| 11 | Do. |
| 12 | Do. |
| 13 | Do. |

Compounds of the examples were subjected to the following herbicidal tests. The results are set forth in Table II following the test descriptions.

HERBICIDE TESTING METHODS

The test species propagated for testing are:

| | |
|---|---|
| Crabgrass | Turnip |
| Yellow Foxtail grass | Cotton |
| Johnson grass | Corn, and |
| Barnyard grass | Bean |

Each specie is planted individually in 3-inch plastic pots containing potting soil. Four seeds each of the corn, cotton, and bean are seeded to a depth equal to the diameter of the seed. The other species are surface seeded and sprinkled with screened soil in an amount sufficient to cover the seed. Immediately, after planting, all pots are watered by sub-irrigation in greenhouse trays. Pots for the pre-emergence phase of testing are seeded one day before treatment.

Planting dates for the post-emergence phase of testing are varied so that all seedlings will reach the desired stage of development simultaneously. The proper stage of seedling development for treatment in the post-emergence tests is as follows:

| | |
|---|---|
| Grasses | 2 inches in height. |
| Turnips | 1 or 2 true leaves visible above cotyledons. |
| Cotton | First true leaf 1 inch in length; expanded cotyledons. |
| Corn | 3 to 4 inches in height. |
| Beans | Primary leaves expanded, growing point at primary leaf node. |

Spray applications are made in a hood containing a movable belt and fixed spray nozzle. For passage through the spray hood, one pot of each specie (pre-emergence phase) is placed on the forward half of a wooden flat and one pot of established plants (post-emergence phase) is placed on the rear half of the flat. Treatments are moved to the greenhouse after spraying. Watering during the observation period is applied only by sub-irrigation.

Compounds are screened at a rate of application equivalent to 8 lbs. actual/acre in a spray volume of 38 gal./acre. Spray hood constants required to deliver the above volume are as follows:

| | |
|---|---|
| Belt speed | 2 m.p.h. |
| Air pressure | Adjusted to provide 38 g.p.a. delivery. |
| Nozzle tip | 8003E (provides uniform cross-section flat spray). |

Formulations for spray applications (as used in the compositions for which data are set forth in the Table hereinafter) are prepared in 50 ml. volumes with the following components:

1. 1.24 grams compound (8 lb./acre rate).
2. 49 ml. of acetone as solvent.
3. 1 ml. xylene-Atlox 3414 (surface-active emulsifier).

Compounds that are insoluble in the customary solvents are formulated either in the Waring blender and applied as suspensions with suitable carriers or dispersants or prepared initially as wettable powders. Compounds that are not available in sufficient quantity for machine spraying are applied by hand with a De Vilbiss atomizer.

Two weeks after treatment, pre- and post-emergence injury or control is visually rated as percent injury or control (percent effectiveness).

TABLE II.—HERBICIDAL ACTIVITY (Percent effectiveness)

| Compound of example | Compound concentration, lbs./acre | Crabgrass | Yellow foxtail grass | Johnson grass | Barnyard grass | Turnip | Cotton | Corn | Bean |
|---|---|---|---|---|---|---|---|---|---|
| Pre-emergence | | | | | | | | | |
| 1 | 8 | 90 | | 90 | 80 | 20 | 0 | 0 | 30 |
| 2 | 8 | 90 | | 90 | 50 | 40 | 0 | 20 | 0 |
| 3 | 8 | 90 | | 30 | 30 | 0 | 0 | 40 | 0 |
| 4 | 8 | 50 | | 30 | 30 | 20 | 50 | 0 | 80 |
| 5 | 8 | 60 | | 0 | 20 | 20 | 80 | 40 | 30 |
| 6 | 8 | 50 | | 20 | 20 | 20 | 100 | 0 | 0 |
| 7 | 8 | 0 | | 60 | 0 | 40 | 80 | 40 | 100 |
| 8 | 8 | 10 | | 10 | 10 | 10 | 80 | 10 | 100 |
| 9 | 8 | 20 | | 10 | 10 | 20 | 50 | 10 | 10 |
| 10 | 8 | 10 | | 80 | 10 | 20 | 10 | 10 | 100 |
| 11 | 8 | 80 | | 30 | 30 | 20 | 30 | 10 | 10 |
| 12 | 8 | 20 | | 20 | 20 | 40 | 40 | 20 | 10 |
| 13 | 8 | | | 10 | 10 | 10 | 10 | 10 | 100 |
| Post-emergence | | | | | | | | | |
| 1 | 8 | 70 | 70 | 70 | 30 | 70 | 40 | 100 | 50 |
| 2 | 8 | 90 | 70 | 70 | 40 | 100 | 80 | 40 | 80 |
| 3 | 8 | 40 | 30 | 30 | 20 | 50 | 0 | 0 | 80 |
| 4 | 8 | 60 | | 40 | 20 | 20 | 30 | 20 | 80 |
| 5 | 8 | 20 | | 40 | | 30 | 50 | 30 | 40 |
| 6 | 8 | 60 | | 70 | 20 | 40 | 40 | 20 | 40 |
| 7 | 8 | 20 | | 0 | 0 | 30 | 50 | 30 | 60 |
| 8 | 8 | 50 | | 20 | 30 | 40 | 30 | | 30 |
| 9 | 8 | 30 | | 40 | | | 40 | | 40 |
| 10 | 8 | 30 | | 40 | 40 | 40 | 50 | 40 | 30 |
| 11 | 8 | 20 | | | | 40 | 50 | | 50 |
| 12 | 8 | 30 | | 30 | | 60 | 50 | 10 | 90 |
| 13 | 8 | 30 | | 30 | 30 | 20 | 50 | 30 | 60 |

From the data in Table II, it will be noted that the 2-aryl-3-aliphaticthioacrylonitriles of this invention have a broad range of both pre- and post-emergence herbicidal activity. They are highly effective against Crabgrass, an annual grass weed which reproduces by seed and is a problem in lawns and field crops. They are also highly effective against Johnson grass, a perennial grass weed which reproduces by seed and underground rhizomes and is a problem in field crops.

The compounds of this invention exhibit considerable pre- and post-emergence herbicidal activity and are disclosed for use in various ways to achieve pre-emergence or post-emergence contact control of undesirable herbs. They can be applied per se, as solids or in vaporized form, but are preferably applied as the toxic components in herbicidal compositions of the compound and a carrier. The compositions can be applied as dusts, as liquid sprays or as gas-propelled sprays and can contain, in addition to a carrier, additives such as emulsifying agents, wetting agents, binding agents, gases compressed to the liquid state, odorants, stabilizers and the like. A wide variety of liquid and solid carriers can be used in the herbicidal compositions. Non-limiting examples of liquid carriers include water; organic solvents such as alcohols, ketones, amides, and esters; mineral oils such as kerosene, light oils, and medium oils; and vegetable oils such as cottonseed oil. Non-limiting examples of solid carriers include talc, bentonite, diatomaceous earth, pyrophyllite, fullers earth, gypsum, flours derived from cotonseeds and nut shells, and various natural and synthetic clays having a pH not exceeding about 9.5.

The amount of the 2-aryl-3-aliphaticthioacrylonitriles of this invention utilized in herbicidal compositions will vary rather widely. It depends to some extent upon the type of composition in which the material is being used, the nature of the condition to be controlled, and the method of application (i.e., spraying, dusting, etc.). In the ultimate herbicidal composition, as applied in the field, herbicide concentrations as low as 0.0001 weight percent of the total composition can be used. In general, compositions, as applied, containing about 0.05 weight percent herbicide in either liquid or solid carrier give excellent results. In some cases, however, stronger dosages up to about 10 weight percent may be required.

In practice, herbicidal compositions are usually prepared in the form of concentrates, which are diluted in the field to the concentration desired for application. For example, the concentrate can be a wettable powder containing large amounts of a compound of this invention, a carrier (e.g., attapulgite or other clay), and wetting and dispersing agents. Such a powder can be diluted prior to application, by dispersing it in water to obtain a sprayable suspension containing the concentration of herbicide desired for application. Other concentrates can be solutions that can be later diluted, e.g., with kerosene, thus, it is within the contemplation of this invention to provide herbicidal compositions containing up to about 80 percent, by weight of the composition, of a herbicidal compound of this invention. Accordingly, depending upon whether it is ready for application or it is in concentrated form, the contemplated herbicidal compositions contain between about 0.0001 percent and about 80 percent, by weight of the composition, of a herbicidal compound of this invention, and a carrier, liquid or solid, as defined hereinbefore.

Although the present invention has been described with preferred embodiments, it is to be understood that modifications and variations may be resorted to without departing from the spirit and scope of the invention, as those skilled in the art will readily understand.

What is claimed is:

1. A compound having the following formula:

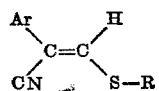

wherein Ar is halophenyl or methoxyphenyl and R is alkyl ($C_1$–$C_6$).

2. The compound of claim 1, having the following structure:

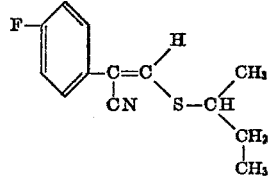

3. The compound of claim 1, having the following structure:

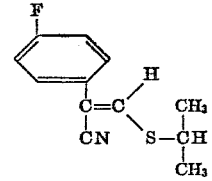

4. The compound of claim 1, having the following structure:

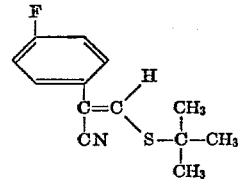

5. The compound of claim 1, having the following structure:

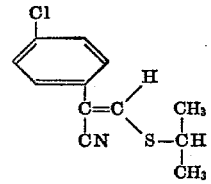

6. The compound of claim 1, having the following structure:

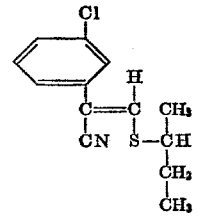

7. The compound of claim 1, having the following structure:

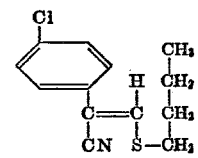

8. The compound of claim 1, having the following structure:

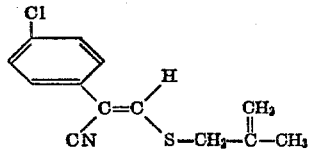

9. The compound of claim 1, having the following structure:

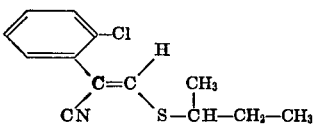

10. The compound of claim 1, having the following structure:

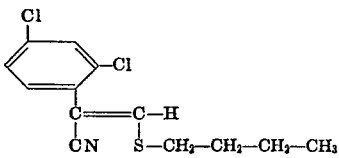

11. The compound of claim 1, having the following structure:

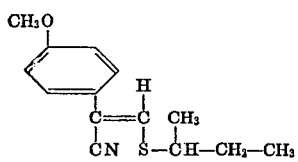

References Cited

UNITED STATES PATENTS

| | | | |
|---|---|---|---|
| 2,609,384 | 9/1952 | Russell et al. | 260—465 |
| 3,050,545 | 8/1962 | Heininger et al. | 260—465 |
| 3,271,408 | 9/1966 | Frazza et al. | 260—465 XR |

OTHER REFERENCES

Scheithauer et al.: *Chem. Ber.*, vol. 100, pp. 1419–20 and 1427 relied upon (1967).

Houben Weyl: Methoden Der Organischen Chemie, Band IX, pp. 117–118 (1955).

LEWIS GOTTS, Primary Examiner

D. H. TORRENCE, Assistant Examiner

U.S. Cl. X.R.

71—88, 90, 94, 98, 104; 260—294.8 G, 332.2 C, 346.2 R, 347.2, 454, 465 D, 465 E, 465 G, 465 H, 465 K

PO-1050
(5/69)

UNITED STATES PATENT OFFICE
CERTIFICATE OF CORRECTION

Patent No. 3,828,091　　　　　　　Dated August 6, 1974

Inventor(s) JERRY G. STRONG

It is certified that error appears in the above-identified patent and that said Letters Patent are hereby corrected as shown below:

Column 5, Table I Example 5
"$\lambda$(film): 8.1 (s), 11.9 (s)$\mu$." should read
--$\lambda$(film): 4.5 (m), 6.2 (m), 8.1 (s), 11.9 (s)$\mu$--.

Signed and sealed this 19th day of November 1974.

(SEAL)
Attest:

McCOY M. GIBSON JR.　　　　　C. MARSHALL DANN
Attesting Officer　　　　　　Commissioner of Patents